(12) United States Patent
Bozkaya et al.

(10) Patent No.: US 10,948,682 B2
(45) Date of Patent: Mar. 16, 2021

(54) SELF-ALIGNING LENS HOLDER AND CAMERA ASSEMBLY

(71) Applicant: Amazon Technologies, Inc., Seattle, WA (US)

(72) Inventors: Dincer Bozkaya, Framingham, MA (US); Matthew Anthony Brady, Boston, MA (US); Douglas Scott Crow, Seabrook, NH (US); Dragan Pajevic, Arlington, MA (US); Seth A. Savage, Westminster, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/934,777

(22) Filed: Mar. 23, 2018

(65) Prior Publication Data

US 2019/0293896 A1    Sep. 26, 2019

(51) Int. Cl.
*G02B 7/00* (2006.01)
*G02B 7/02* (2021.01)
*H04N 5/225* (2006.01)
*G02B 13/06* (2006.01)

(52) U.S. Cl.
CPC .............. *G02B 7/003* (2013.01); *G02B 7/02* (2013.01); *G02B 7/023* (2013.01); *G02B 7/026* (2013.01); *H04N 5/2253* (2013.01); *H04N 5/2254* (2013.01); *G02B 13/06* (2013.01); *G03B 2205/00* (2013.01); *H04N 5/2257* (2013.01); *H04N 5/2258* (2013.01)

(58) Field of Classification Search
CPC ........ G02B 7/003; G02B 7/02; H04N 5/2254; H04N 5/2253; H01L 27/14; H01L 27/146; H01L 27/14601; H01L 23/544

USPC ................ 348/335, 340, 345, 348, 350, 352
See application file for complete search history.

(56) References Cited

U.S. PATENT DOCUMENTS

| 6,384,397 | B1 | 5/2002 | Takiar et al. |
| 9,513,458 | B1 | 12/2016 | Flugge et al. |
| 9,521,321 | B1* | 12/2016 | Kozko ............... H04N 5/23238 |
| 2004/0080658 | A1 | 4/2004 | Cambou et al. |
| 2005/0179805 | A1* | 8/2005 | Avron ............... H01L 27/14625 |
| | | | 348/340 |
| 2009/0244851 | A1 | 10/2009 | Kuo et al. |
| 2011/0069221 | A1* | 3/2011 | Yee ..................... H04N 5/2253 |
| | | | 348/374 |
| 2013/0208369 | A1 | 8/2013 | Lam |

(Continued)

FOREIGN PATENT DOCUMENTS

| GB | 2463757 A | 3/2010 |
| JP | 09121040 A * | 5/1997 ............. G02B 7/022 |
| JP | H09-121040 A | 5/1997 |

(Continued)

OTHER PUBLICATIONS

International Patent Application No. PCT/US2019/023758; Invitation to Pay Add'l Fees; dated May 28, 2019; 10 pages.

(Continued)

*Primary Examiner* — Yogesh K Aggarwal
(74) *Attorney, Agent, or Firm* — BakerHostetler

(57) ABSTRACT

A self-aligning lens holder includes elements that register against an image sensor chip to align the holder and lens with the chip. The elements may deflect or deform. A corresponding method aligns the lens holder and a fisheye lens to the image sensor.

21 Claims, 6 Drawing Sheets

(56) References Cited

U.S. PATENT DOCUMENTS

2014/0028905 A1* 1/2014 Kim .................. H04N 5/2257
                                                    348/374

FOREIGN PATENT DOCUMENTS

| JP | 3337517 B2 | 10/2002 |
|---|---|---|
| JP | 2006-337920 A | 12/2006 |
| JP | 2007-102017 A | 4/2007 |
| JP | 2007-147765 A | 6/2007 |
| JP | 2008-040017 A | 2/2008 |
| WO | WO 2017/052988 A1 | 3/2017 |

OTHER PUBLICATIONS

International Patent Application No. PCT/US2019/023758; Int'l Search Report and the Written Opinion; dated Aug. 1, 2019; 19 pages.

International Patent Application No. PCT/US2019/023758; Int'l Preliminary Report on Patentability; dated Oct. 8, 2020; 11 pages.

* cited by examiner

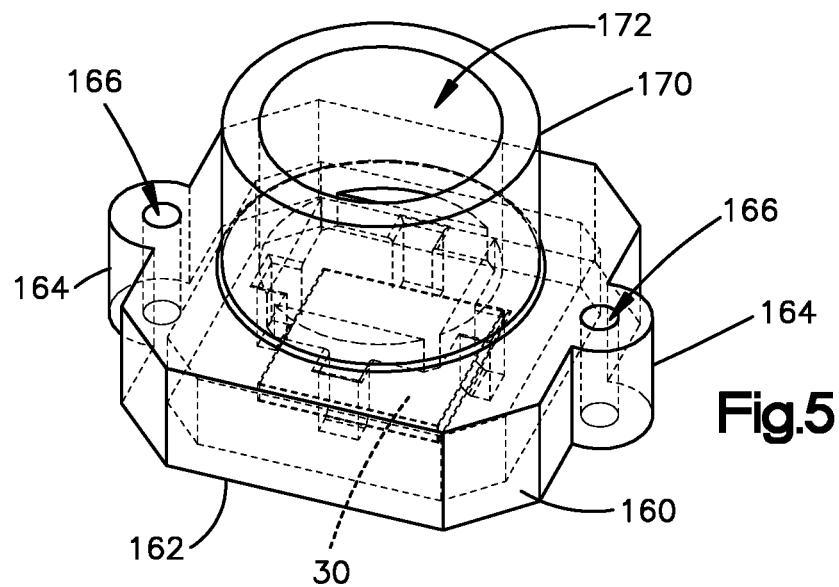
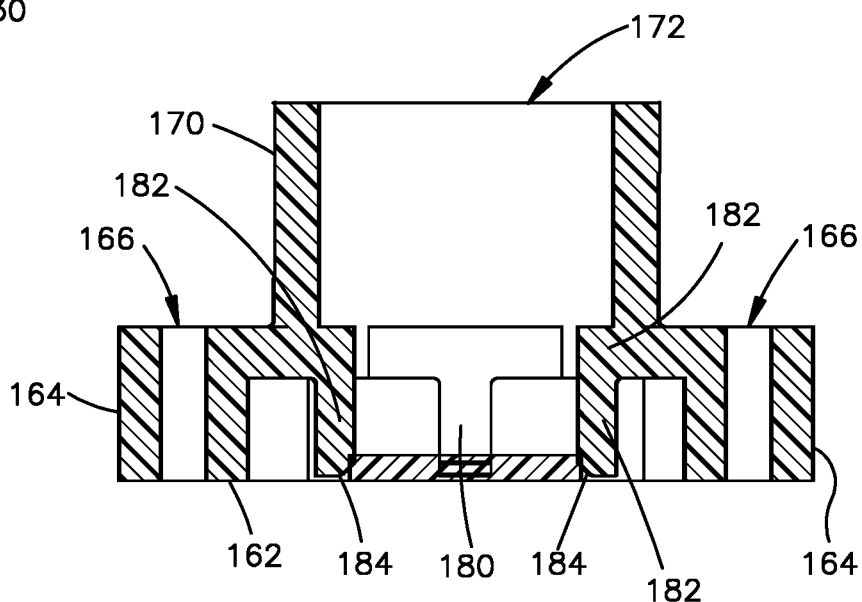
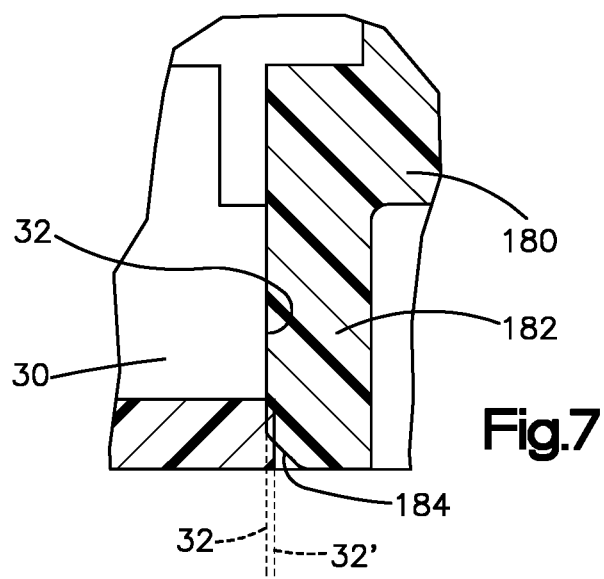

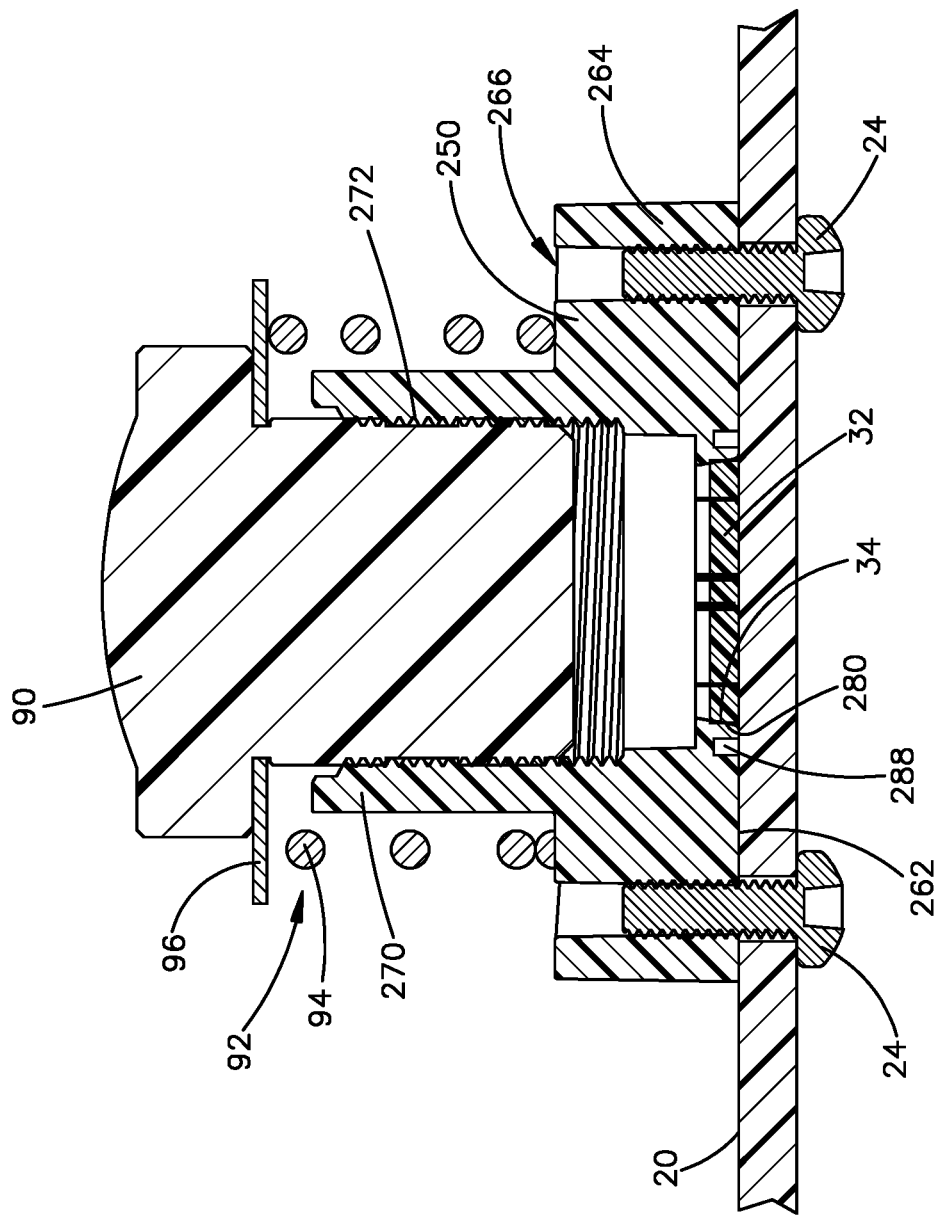

SELF-ALIGNING LENS HOLDER AND CAMERA ASSEMBLY

BACKGROUND

Modern mobile drive units in fulfillment facilities have an upwardly-facing camera that looks at the underside of its cargo or carrier, such as a pod, and a downwardly-facing camera that looks at fiducial markers on the floor. Mobile drive units use floor fiducials to navigate to various locations in fulfillment facilities. Mobile drive units use pod fiducials prior to actuating a pod to confirm that the correct pod is being moved.

Modern cameras include a solid state image sensor, such as CCD (charge coupled device) or CMOS (complementary metal-oxide semiconductor) sensor in a single chip mounted on a circuit board. Typically, a lens over the sensor focuses the target image on the sensor.

Conventional assembly of an image sensor and lens on a circuit board can include installing the sensor chip of an assembly board by an automated pick and place machine using conventional surface mount technology. A conventional lens holder is placed about the sensor chip and screwed to the assembly board from the opposite side (that is, an upwardly facing camera would be screwed to the board through the underside of the board). The lens is affixed to the lens holder, such as via a threaded connection or interference fit.

In some conventional lens holder assemblies, a spring assembly preloads (that is, applies a force in a direction opposite a base of the lens holder) the lens to eliminate the thread backlash to maintain constant and desired focal distance. The spring assembly includes a flange plate or washer and a coil spring. The washer is located on the underside of a shoulder of the lens and the coil spring wraps around the shaft of the lens holder to push upwardly on the washer against a base of the lens holder to upwardly bias the lens in the cavity of the lens holder.

Coordination between top and bottom cameras enable the mobile drive unit to position itself under the pod using the fiducial targets. In a simplest configuration, the top and bottom cameras can be positioned at the same location in x-y coordinates such that the top and bottom cameras share a common vertical axis. However, it is difficult to locate the image sensors at the same x-y position on each side of a single printed circuit board due to circuit board layout constraints. Mounting each image sensor on a separate circuit board results in height increase and additional cost and complexity.

BRIEF DESCRIPTION OF THE DRAWINGS

FIG. 5 is a perspective, partially transparent view of a second embodiment of a lens holder and image sensor;

FIG. 6 is a cross sectional view of the embodiment of FIG. 5;

FIG. 7 is an enlarged view of a portion shown in FIG. 6;

FIG. 8 is an enlarged view of a portion of a lens holder illustrating a third embodiment;

DETAILED DESCRIPTION OF ILLUSTRATIVE EMBODIMENTS

In the embodiments shown in the figures, an upward-facing wide angle (fisheye) lens and a downward facing fisheye lens are employed, which has advantages when the spacing between the lens and target fiducial marker is small. Employing the fisheye lens requires great precision and accuracy of physical alignment of the lens with the corresponding image sensor, taking into account field of view, clarity, and distortion.

In this regard, the use of a wide angle lens can aid in diminishing or minimizing the height of the mobile drive unit while maintaining a field-of view suitable for reading fiducial markers. But when using a fisheye lens, misalignment of the lens to the image sensor gets magnified through the lens, which can cause a loss of effective field of view, also referred to as shift of target, and cause distortion of the target.

Further, the location of the image sensor chip on the circuit board often has a large tolerance, which can exacerbate misalignment, as conventional methods of assembly often employ fixture to locate the lens holder in reference to other features of the printed circuit board, such as mounting holes. Further, screws are typically used to secure the lens holder to the circuit board, and it has been found that lens holder tends to move during assembly process causing misalignment of the lens holder relative to the sensor. In some cases, contact between the lens holder and the chip can put stress on the chip.

A self-aligning lens holder described herein has features to align itself to the image sensor chip. As explained above, one particular problem that can cause misalignment is the tolerance for the location of image sensor on the circuit board. Accordingly, the lens holder registers itself to the sensor chip registration elements, such as small tabs or fingers or undercuts, which accounts for the positional tolerance of image sensor. Locating the lens holder is also more easily accomplished, which speeds manufacturing and in some circumstances requires no special tools. The inventors believe that the lens holder described herein significantly improves the placement of the assembly, among other advantages.

Figure 1:
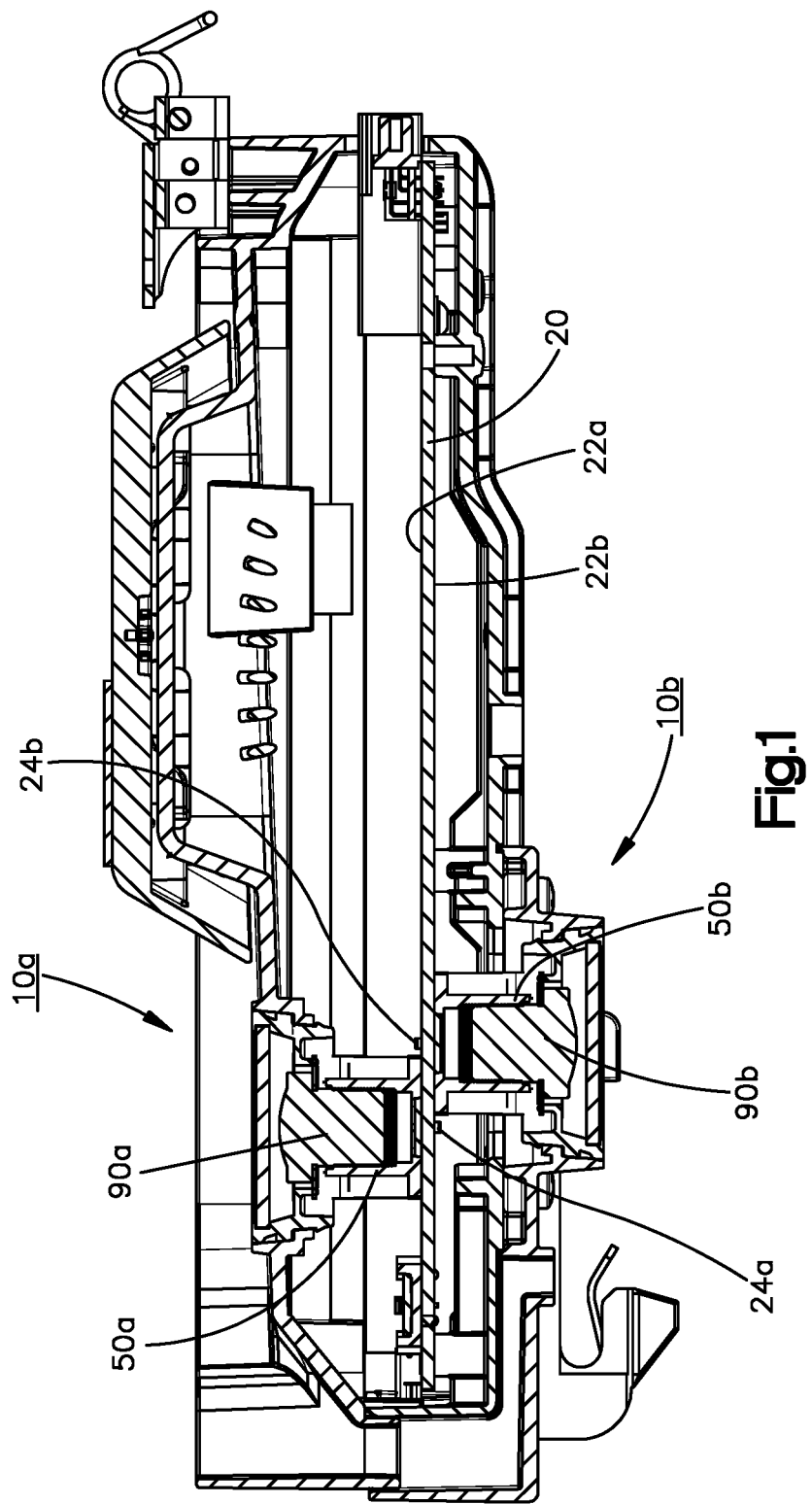
FIG. 1 is a cross sectional view of a circuit board of a mobile drive unit, illustrating a pair of camera assemblies.
Figure 2:
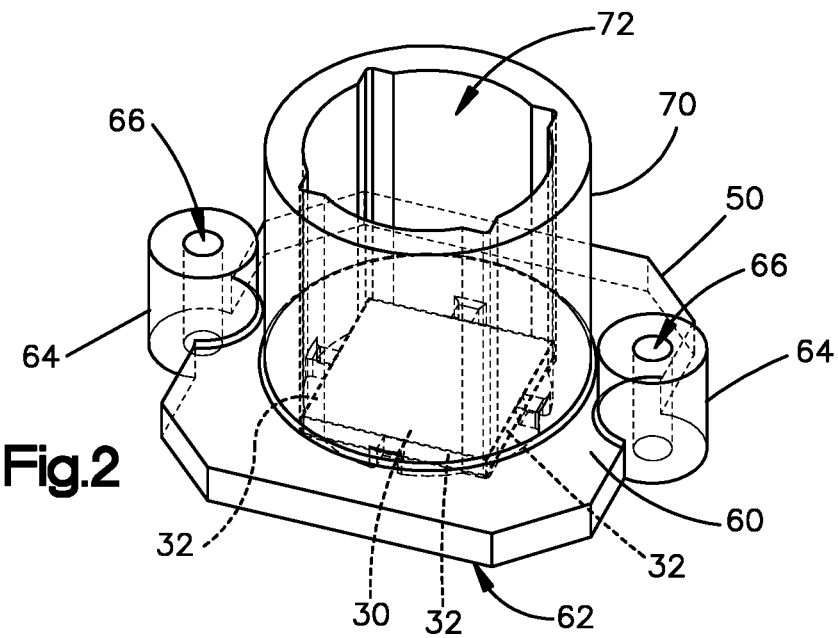
FIG. 2 is a perspective, partially transparent view of a first embodiment of a lens holder and image sensor.
Figure 3:
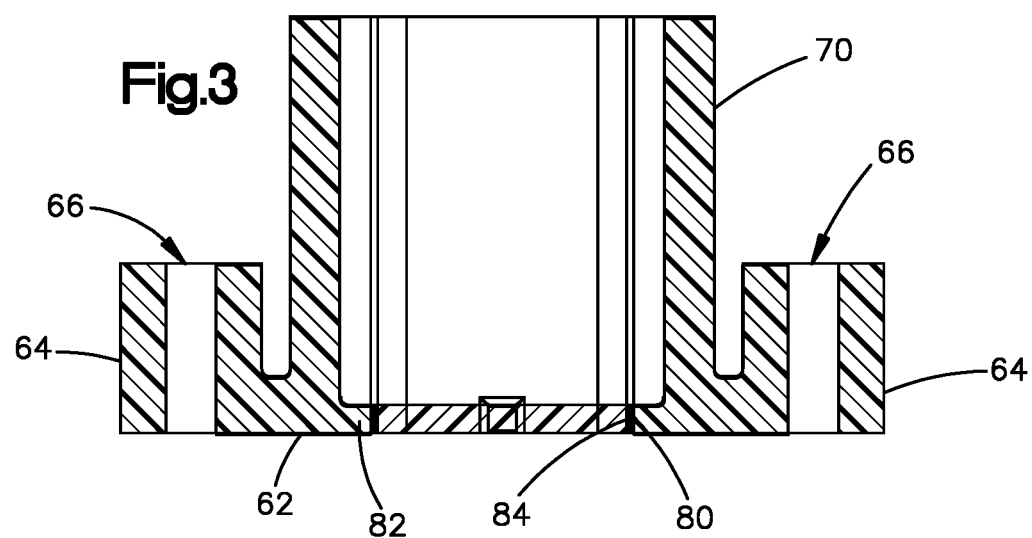
FIG. 3 is a cross sectional view of the embodiment of FIG. 2.

FIG. 1 illustrates a circuit board assembly of a mobile drive unit that includes an upwardly-facing camera assembly 10*a* mounted to a topside 22*a* of a circuit board 20 and a downwardly-facing camera assembly 10*b* mounted to an underside 22*b* of circuit board 20. The letters "a" and "b" appended to reference numbers indicate a topside and underside structure or orientation. The letter designation is not used when referring to the features of the structure disembodied from the circuit board and common to the topside and underside components.

As illustrated in FIG. 1, the camera assemblies 10*a* and 10*b* are offset relative to one another and mounted on opposing sides of the same circuit board 20. The offset configuration can replace a conventional configuration in which the centerlines of cameras 10*a* and 10*b* are coincident. The offset configuration has drawbacks compared with an in-line configuration (such as more complicated image processing), yet in some circumstances the advantage of more efficient use of vertical space in a mobile drive unit (and therefor aiding in the overall height decrease of the mobile drive unit) outweighs the complicating factors of the offset cameras. Topside camera 10a is affixed to board 20 by screws 24a that extend from circuit board underside 22b. Underside camera 10a is affixed to board 20 by screws 24b that extend from circuit board topside 22a. Screwing into the camera unit from the opposing side simplifies assembly, as the cameras are offset.

Topside camera 10a and underside camera 10b each include an image sensor, such as a CCD or other solid state chip 30, a lens holder 50, a lens 90, and a spring assembly. In the embodiment shown in the figures, lens 90 is a fisheye lens. Referring to FIGS. 2 through 5 to illustrate a first embodiment structure, a chip 30 preferably is conventional and has is a rectangle or square, and is surface mounted to the corresponding side of board 20 (that is, 22a or 22b) by conventional surface mount technology. Chip 30 includes four side faces 32 and top face 34.

Lens holder 50 includes a base 60 that defines a planar datum or mounting surface 62 and a shaft 70 that extends upwardly from base 60. A pair of flanges 64 extend on opposing sides of base 60 and include bores 66 into which screws 24 (shown in FIG. 1) can be engaged. Shaft 70 includes a bore 72 that is configured to receive lens 90. Preferably, lens 90 is conventional and is engaged with bore 72. Preferably, the threads taper downwardly 0.2 to 2 degrees so the lens 90 initially encounters loose threads then lens 90 centers itself in bore 72 near its full insertion point, which can also be configured to be at a desired focal distance between the lens 90 and the chip 30.

The base 60 includes four inboard-facing registration elements, tabs 80, that are spaced 90 degrees apart and oriented such that each one of the tabs is aligned with a corresponding side face 32 of chip 30. Each tab 80 includes a base 82 that has a bottom surface that is part of mounting surface 62. The bottom surface of base 82 may be co-planar with the rest of mounting surface 62 and other configurations are contemplated. The inboard or distal part of tab 80 is a contact surface 84, which in the embodiment shown in the figures (and best shown in FIG. 4) is a bevel or undercut to form an uppermost edge or lip. Preferably the edge of contact surface 84 is straight and level (in top view) such that lens holder surface 84 continuously (that is, in an unbroken line) contacts chip side face 32 at or near the center of each side face. Other configurations of tab 80 are contemplated, such as an edge that is not at the uppermost portion of tab 80, and any tab width, such as a tab width that spans the entire length of side face 32, a tab width between 50% and 75% of the corresponding chip width dimension, or a tab width that is less than 50% of the corresponding chip width, such as 10% to 50%, or 20% to 35% of the chip width, or several short tabs per side.

Figure 4:
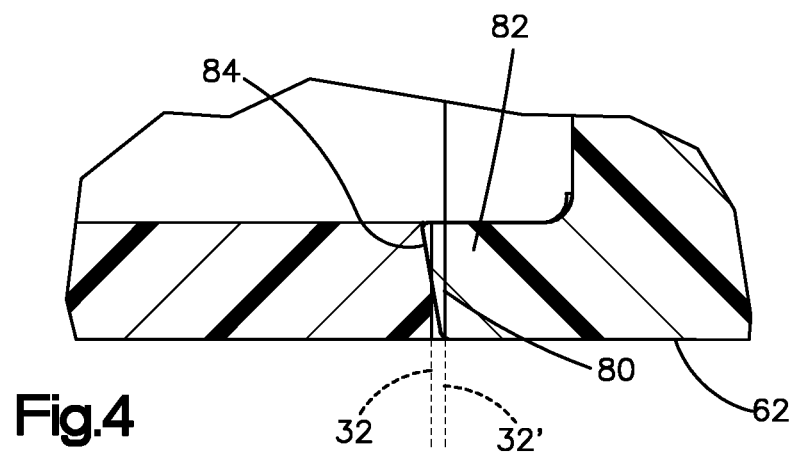
FIG. 4 is an enlarged view of a portion shown in FIG. 3.

FIG. 4 illustrates a representation of the location of side face 32 of chip 30. A surface, illustrated by reference number 32', represents the location of face 32 based on its dimensional tolerance range. The tolerance range can come from manufacturing tolerance, dimensional changes from thermal expansion or contraction, and the like. Contact surface 84 preferably is deflectable (horizontally in the orientation of the figures) upon contact with chip 30. Further, the bevel of contact surface 84 is at or near the leading surface as the lens holder 50 is applied to chip 30. Thus, bevel 84 functions to self-center lens holder 50 relative to chip 30 upon application of the lens holder to the chip.

The mechanical stress on the chip due to contact with the tabs is preferably maintained at a low level by choosing the dimensions, materials, and the overall deflection of the tabs. In this regard, the opening between opposing tab contact surfaces 84 preferably is the dimension equal to the corresponding width of chip 30 at the minimum range of its dimensional tolerance. And the magnitude of acceptable deflection of surface 84 is designed to be at least the entire dimensional tolerance range of the width of chip 30. For example, if chip 30 has a specified width of W+/−0.001 inches, lens holder 50 can configured to have an opening (for receiving the chip) having a dimension between opposing tab surfaces 84 of W−0.001 inches, and surface 84 can deflect at least 0.001 inches (that is, each opposing surface 84 can deflect 0.001 inches such that lens holder 50 deflects a total of 0.002 inches on the x axis). The same configuration can be applied to the adjacent sides for the chip dimension along the y axis, such that the alignment of the lens holder is in both the x and y directions. The term "deflect" and its variants is the specification and claims broadly to refer to any dimension movement, including elastic and/or plastic deformation.

FIGS. 5 through 7 illustrate a second embodiment lens holder 150 that may be employed with chip 30 on board 20. Lens holder 150 includes a base 160 that defines a planar datum or mounting surface 162 and a shaft 170 that extends upwardly from base 160. A pair of flanges 164 extend on opposing sides of base 160 and include bores 166 into which screws 24 (shown in FIG. 1) can be engaged. Shaft 170 includes a bore 172 that is configured to receive lens 90. Preferably, lens 90 is conventional and is engaged with bore 172 by conventional means.

The base 160 includes four inboard-facing registration elements, finger assemblies 180, that are spaced 90 degrees apart and oriented such that each one of the finger assemblies 180 is aligned with a corresponding side face 32 of chip 30. Each finger assembly 180 includes a finger 182 that extends downwardly from an inboard portion of base 160 or shaft 170 at a location that is spaced apart from mounting surface 162. A distal (that is, lower in the orientation of the figures) portion of finger 182 is free such that finger 182 is a vertically oriented cantilever (in cross section). Finger 182 at or near its distal end includes a contact surface 84, which in the embodiment shown in the figures includes a bevel.

Preferably the distal tip of finger 182 and contact surface 184 are straight and level (in side view) such that surface 184 continuously (that is, in an unbroken line) contacts chip side face 32 at or near the center of each side face. Other configurations of finger assembly 180 are contemplated, such as a finger that is not vertically oriented, and any finger width, such as a finger width that span the entire length of side face 32, a finger width between 50% and 75% of the corresponding chip width, or a finger width that is less than 50% of the corresponding chip width, such as 10% to 50%, or 20% to 35% of the chip width, or several short fingers per side.

FIG. 7 illustrates a representation of the location of side face 32 of chip 30. A surface, illustrated by reference number 32', represents the location of face 32 based on its dimensional tolerance range. The tolerance range can come from manufacturing tolerance, dimensional changes form thermal expansion or contraction, and the like. Contact surface 184 preferably is deflectable (horizontally in the orientation of the figures) upon contact with chip 30 in a way consistent with deflection of cantilever beams. Bevel 184 can perform the centering function as described above for bevel 84.

In this regard, the opening between opposing finger contact surfaces 184 preferably is the dimension equal to the corresponding width of chip 30 at the minimum of its dimensional range. And the magnitude of acceptable deflection of surface 184 is designed to be at least the entire dimensional tolerance range of the width of chip 30. For example, if chip 30 has a specified width of W+/−0.001 inches, lens holder 150 is configured to have an opening (for receiving the chip) having a dimension between opposing contact surfaces 184 of W−0.001 inches, and surface 184 can deflect at least 0.001 inches (that is, each opposing surface 184 can deflect 0.001 inches such that lens holder 150 deflects a total of 0.002 inches). The same configuration can be applied to the adjacent sides for the chip dimension along they axis, such that the alignment of the lens holder is in both the x and y directions.

Figure 9:
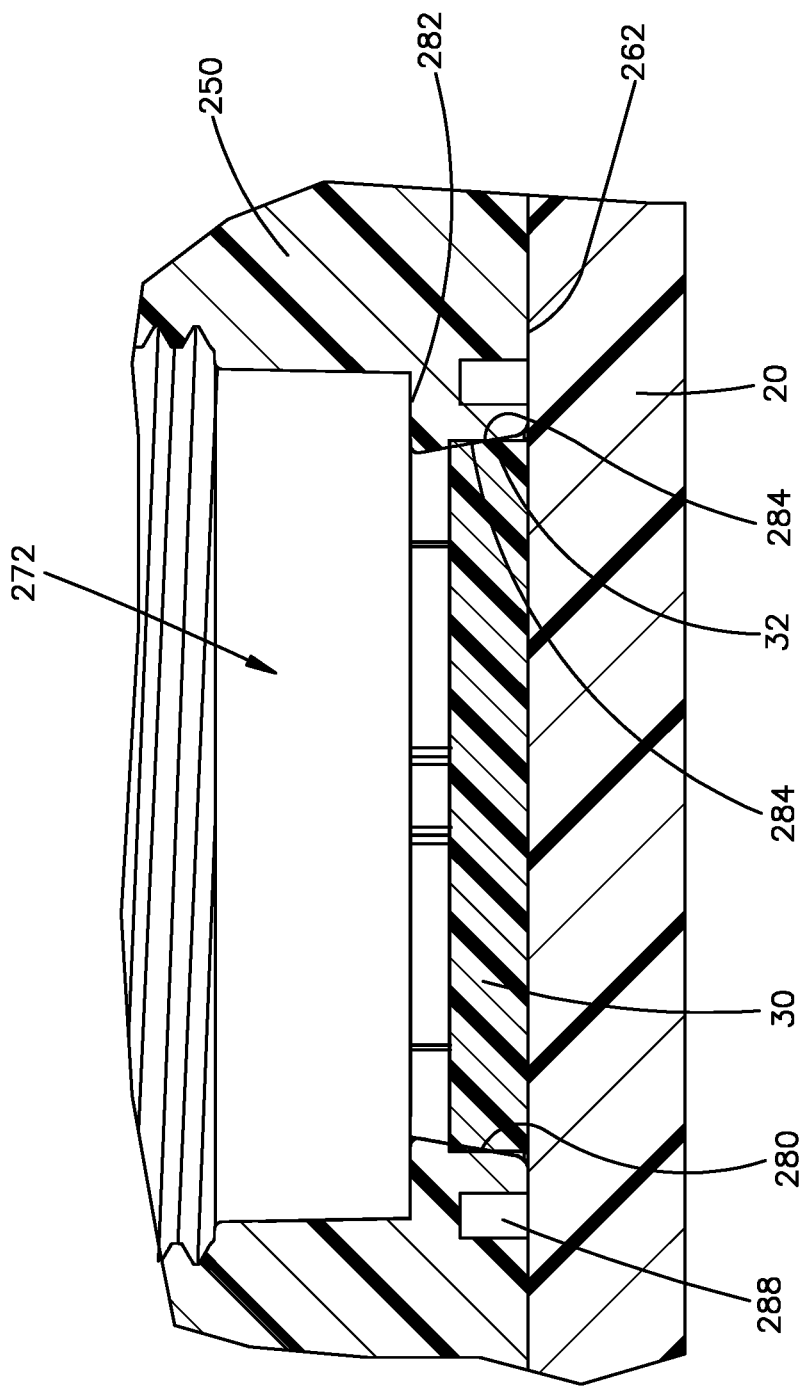
FIG. 9 is an enlarged view of a portion of the lens holder of FIG. 8.

FIGS. 8 and 9 illustrate a third embodiment lens holder 250 that includes a base 260 that defines a planar datum or mounting surface 262 and a shaft 270 that extends upwardly from base 260. A pair of flanges 264 extend on opposing sides of base 260 and include bores 266 into which screws 24 are engaged. Shaft 270 includes a bore 272 that is configured to receive lens 90. Preferably, lens 90 is conventional and is engaged with bore 172, such as by the screw threads shown in FIG. 7. Optionally, bore 272 may include a tapered section that tapers in the range of 0.2 to 2.0 degrees. As the lens is screwed into the bore, the taper self-centers the lens in relation to the center of the bore 272.

The base 260 includes four inboard-facing registration elements, contact faces 280, that are spaced 90 degrees apart and oriented such that each one of the faces 280 is aligned with a corresponding side face 32 of chip 30. Each surface 280 includes a contact face 284 (FIG. 9) that extends downwardly from an inboard base portion 282 of base 160 at a location that is spaced apart from mounting surface 262. Face 284 may be vertical or inclined with an undercut or other configuration. Outboard of contact face 284 is a cutout 288 that diminishes the stiffness of face 284 and provides compliance for face 284 relative to chip surface 82, as explained more fully below. Surface 284 may include a bevel having the same centering function as described above for bevel 84

Preferably the contact surface 284 is straight and level (in side view) such that surface 84 continuously (that is, in an unbroken line) contacts chip side face 32 across the entirety, or nearly the entirety, of chip side face 32. Other configurations of surface 280 are contemplated, such as surface width that does not match the corresponding width dimension of chip 30 (such as contact surface widths between 50% and 75% of the corresponding chip width, or contact surface widths that are less than 50% of the corresponding chip width, such as 10% to 50%, or 20% to 35% of the chip width, or several short fingers per side). Preferably, contact surface 284 is centered relative to face 32 (in top view).

The spacing between opposing surfaces 284 relative to chip 30 may be as described above for first and second embodiment lens holders 50 and 150. For configurations in which the depth of contact surface 284 has a height that is greater than the height of chip side wall 32, the dimension between opposing contact surfaces may be chosen at an appropriate point on surfaces 84, such as at the location of greatest force (if any) that may be applied to chip 30.

FIG. 8 also illustrates a spring assembly 92, including a coil or helical spring 94 and a top plate 96. Spring 94 is compressed between an upper portion of base 260 and the underside of plate 96. The upper side of plate 96 is in contact with an underside or flange of lens 90 such that spring 94 imparts an upward force on lens 90, to retain lens 90 in shaft 270.

Lens holder 50 (or 150 or 250) preferably is formed by injection molding as a single, unitary piece of a stable plastic, such as a glass-filled polycarbonate (for example, as marketed under the name Lexan and supplied by SABIC). Other materials may be employed according to the desired parameters of the lens holder, such as the strain characteristics of the material, structural configuration of the tab or finger, dimensional stability of the material, manufacturing factors, and like parameters that will be understood by persons familiar polymer manufacturing technology. The material of lens holder 50 (or 150 or 250) may also be chosen to receive screws 24a and 24b, such that the screws thread themselves into the material of the bore 66 (or 166 or 266).

To assemble the cameras, a topside image sensor chip 30a is surface mounted to circuit board topside surface 22a and underside image sensor chip 30b is surface mounted to circuit board underside surface 22b. Sensors 30a and 30b are offset by a dimension sufficient to facilitate screwing from the opposing side, such as an offset of approximately 12 mm. For each sensor 30, a lens holder 50 (or 150 or 250) is positioned on board surface 22 about sensor 30 to engage registration elements 80 (or 180 or 280), as contact surfaces 84 (or 184 or 284) engage all four sides of chip 30 at side surfaces 32 and deflect if needed, thereby aligning the lens holder relative to chip 30. Lens 90 may be installed by well-known techniques.

The offset configuration of the cameras aids in efficiently utilizing vertical space while using only a single circuit board, which aids in the reducing the height of the mobile drive unit compared with prior embodiments.

Figure 10:
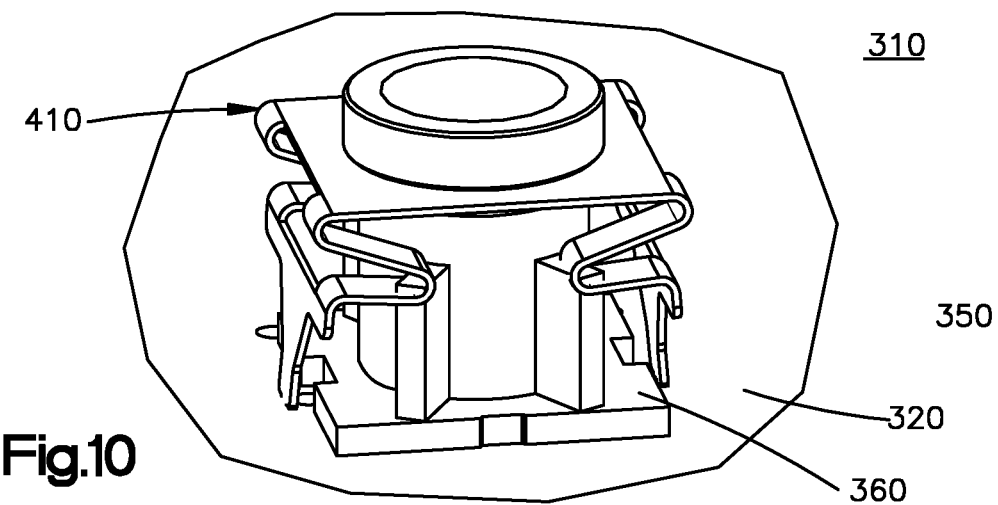
FIG. 10 is a perspective view of a fourth embodiment lens holder and a spring clip.

As illustrated in FIG. 10, another embodiment camera assembly 310 includes a lens holder 350, a spring clip 410, and a lens 90. Lens holder 350 may include any of the registration elements described above for lens holders 50, 150, and 250. And any of the lens holders 50, 150, and 250 may employ the external features of lens holder 350 and corresponding spring clip 410.

Lens holder 350 includes a base 360, a mounting surface 362 on the underside of the base, and a shaft 370 that extends upwardly from the base. Shaft 370 includes a bore 372 (not shown in the figures) into which lens 90 is threaded. Bore 372 may be configured as described for bore 272 in the embodiment lens holder 250. Four vertical columns or ribs 380 vertically extend along shaft 370 at locations proximate to the corners of base 360. A slot 382 is formed in each one of the ribs near its upper or distal end to form a shoulder 384 on each one of the ribs.

Preferably, the base 360, shaft 370 and ribs 380 are formed of a single, unitary piece of a stable plastic, such as a glass-filled polycarbonate (for example, as marketed under the name Lexan and supplied by SABIC). Other materials may be employed according to the desired parameters of the lens holder, such as the strain characteristics of the material, structural configuration of the registration elements, dimensional stability of the material, manufacturing factors, and like parameters that will be understood by persons familiar polymer manufacturing technology.

Figure 11:
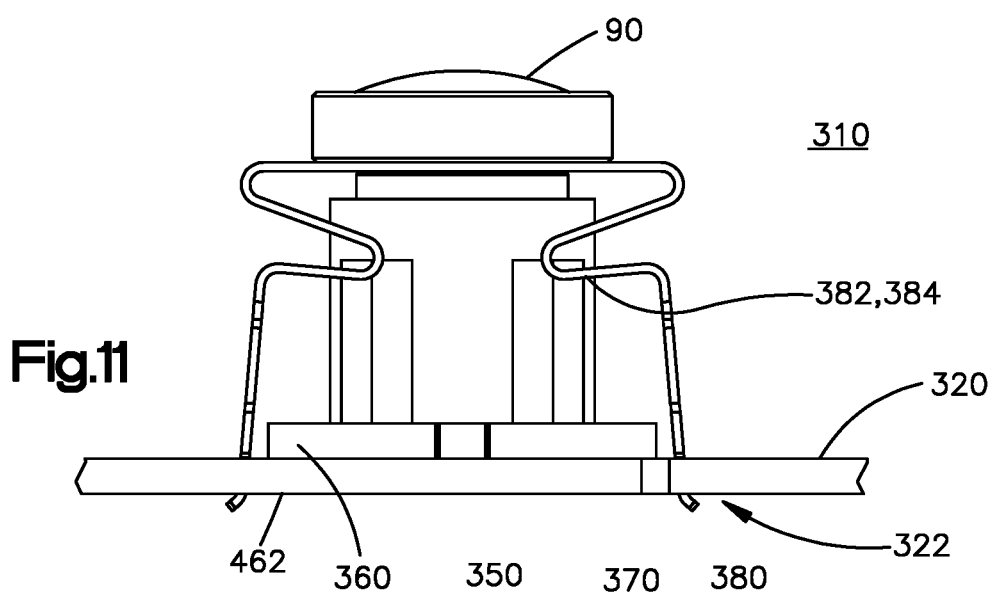
FIG. 11 is a side view of the assembly of FIG. 10.
Figure 12:
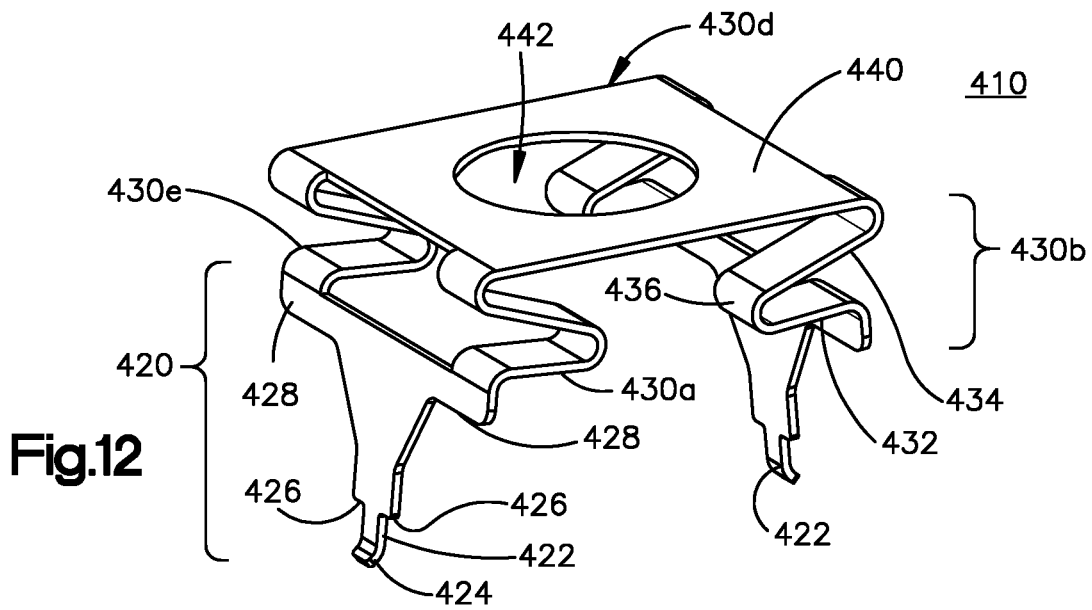
FIG. 12 is a perspective view of the spring clip shown in FIG. 10.

Spring clip 410, which is shown isolated in FIG. 12 and installed in FIG. 10 and FIG. 11, includes legs 420, v-springs 430, and a top plate 440. Preferably, spring clip 410 is formed of a spring steel as a unitary (that is, one-piece) structure by conventional manufacturing methods. Legs 420 are a pair of opposing, downwardly protruding members that taper to tabs or fingers 422 at the lowermost points. Each finger 422 has a width that is chosen together with the size of a through-hole 322 in circuit board 320 such that finger 422 can be inserted into through-hole 322 without precision alignment. Hole 322 can be rectangular or circular or other shape. Finger 422 at its distal tip has an outwardly oriented bend 424 to aid in the retention of leg 420 in through-hole 322, as explained more fully below.

A portion of leg 420 extends upwardly from finger 422, and is wider than finger 422 to form a shoulder or stop 426 that can engage circuit board 320 upon installation of the clip to the circuit board. Leg 420 widens upwardly and includes a pair of transverse elements or arms 428.

Near each distal end of each arm, a v-spring 430 extends inwardly. In this regard, clip 410 includes four v-springs, which have been designation 430a and 430b (referred to as front v-springs) and 430c and 430d (referred to a rear v-springs). Front v-springs 430a and 430b are mutually opposing and inwardly oriented. Rear v-springs 430c and 430d are mutually opposing and inwardly oriented.

Each v-spring 430 includes a lower member 432, an upper member 434, and a u-shaped connection 436 between the lower and upper members 432 and 434. An end of lower member 432 opposite connection 436 merges into arm element 428. An end of upper member 434 merges into top 440. Top plate 440 includes an aperture 442 through which lens 90 is inserted to engage bore 372 of the lens holder. The upper surface of top plate 440 contacts an underside of a flange portion of lens 90. In the embodiment shown in the figures, v-spring 430 is engaged with shoulder 384 of lens holder 350. A portion of spring lower member 432 is located in slot 382 on each of the four columns 380, thereby retaining clip 410.

Clip 410 is engaged with lens holder 350 to create an upward force on lens 90 upon application of lens 90 into shaft 370. The insertion of lens 90 into shaft 370 compresses the top portion of v-spring by deforming the connection between the upper member 434 and top plate 440, deforming or bending upper member 434, and compressing connection 436. Because of the angled configuration of legs 420 and lower portion 432 of v-springs 430, clip 410 may also create a downward force on the lens holder 350, which force is transmitted to circuit board 320. The downward force retain lens holder 350 in position. The spring may be chosen according to known parameters for the particular application. Legs 420 are splayed or oriented outwardly in its rest position, shown in FIG. 12.

The configuration spring clip 410 enables the use of self centering lens by securing it to the circuit board 20 with little or no stresses to the registration elements 80, 180, 280 and the chip 30 during installation, while simplifying the number of parts.

Thus, for installing the assembly, legs 420 are pushed inwardly (in the orientation shown in FIG. 11) until fingers 422 are aligned with and inserted into through-holes 322 and leg shoulders 426 rest against the top surface of circuit board 320. Clip 410 is formed (preferably) of spring steel such that the legs 420 create an outwardly-oriented force on the through-holes 322 of the circuit board. Upon application of lens 90 to deform the v-springs 430, clip 410 via the spring clips 430 create an upward against the underside of lens 90, which is retained in lens holder bore 372, such as by threads. In this regard, assembly can be completed from one side of the circuit board 20 for each one of the camera assemblies (such as 10a and 10b).

The present invention is described by explaining details of various embodiments of the lens holder mounted to a circuit board. The present invention is not limited to the particular embodiments or details of the embodiments described herein, as the embodiments and details are provided merely to illustration purposes. For example, in the embodiments shown, four elements for registering the lens holder against the chip are shown. The present invention is not limited to at least two, or to four elements (one for each side of the chip), but rather encompasses other configurations such as elements on the corners (including on any number of the corners) of the chip or other structure, and is not limited to any quantity of elements, as the function of elements in some circumstances may be achieved without an element for each side or corner of the chip or other structure. Moreover, means for attaching the lens holder to the circuit board, means for providing a force on the lens, and other means have been described with respect to the embodiments shown, but the present invention is not intended to be limited to these means shown and described. Rather, it is intended that the claims be given their full scope according to their plain meaning without undue limitation by the particular details used in the specification.

The invention claimed is:

1. A self-aligning camera assembly comprising:
a circuit board;
a solid state image sensor mounted to a circuit board;
a lens holder including a base and a shaft, the lens holder base including registration elements that are adapted to register the lens holder relative to the image sensor upon engaging the lens holder with the image sensor, thereby aligning the lens holder with the image sensor; each one of the registration elements engages a corresponding surface of the image sensor and is adapted for deflecting relative to the shaft of the lens holder upon engagement with the surface of the image sensor;
screws coupling the base of the lens holder to the circuit board; and
a lens coupled to the lens holder.

2. The camera assembly of claim 1 wherein each one of the registration elements has a contact surface that is adapted for deflecting at least 0.01 inches upon engagement with the surface of the image sensor.

3. The camera assembly of claim 1 wherein the registration elements are at least two registration elements and the lens is a fisheye lens.

4. The camera assembly of claim 1 wherein each one of the registration elements is an inboard-facing tab, each one of the tabs having a bevel surface that engages a corresponding side of the image sensor.

5. The camera assembly of 4 wherein the bevel surface is an undercut.

6. The camera assembly of claim 1 wherein each one of the registration elements is a cantilevered finger.

7. The camera assembly of claim 6 wherein each one of the fingers is approximately vertical and has a distal, lower portion that engages a corresponding side of the image sensor.

8. The camera assembly of claim 1 wherein the circuit board has a topside and an underside, the image sensor is a downwardly-facing, underside image sensor mounted on the circuit board underside, and the lens holder is an underside lens holder that is mounted to the circuit board underside, and wherein the camera assembly further comprises an upwardly-facing, a topside image sensor mounted to the circuit board topside and a topside lens holder that is mounted to the circuit board topside about the topside image sensor; wherein the topside lens holder and topside image sensor are offset relative to the underside lens holder and underside image sensor.

9. The camera assembly of claim 8 wherein the topside lens holder is attached to the circuit board by screws from the circuit board underside and the underside lens holder is attached to the circuit board by screws from the circuit board topside.

10. A method of assembling a camera to a circuit board, comprising the steps of:
   (a) mounting a solid state image sensor to a circuit board; and
   (b) engaging the image sensor with a lens holder, including contacting the image sensor with registration elements of the lens holder to align the lens holder with the image sensor, the engaging step including deflecting of the registration elements relative to a shaft of the lens holder upon contacting the image sensor with the registration elements.

11. The method of claim 10 wherein the engaging step (b) includes engaging an opposing pair of registration elements against opposing sides of the image sensor, thereby aligning the lens holder to the image sensor.

12. The method of claim 11 further comprising the step of inserting screws through the circuit board into the lens holder after the engaging step (b) to anchor the lens holder to the circuit board.

13. The method of claim 11 wherein the registration elements are four inboard-facing, beveled tabs, and wherein the engaging step (b) includes deflecting the tabs against side faces of the image sensor.

14. The method of claim 11 wherein the registration elements are four cantilevered fingers, and wherein the engaging step (b) includes deflecting distal ends of the cantilevered fingers against side faces of the image sensor.

15. The method of claim 11 wherein the lens holder holds a fisheye lens, such that the engaging step (b) includes aligning the fisheye lens with the image sensor.

16. A camera assembly comprising:
   a circuit board having at least a pair of through holes;
   a solid state image sensor mounted to a circuit board between the through-holes;
   a lens holder including a base, a shaft extending upwardly from the base, and shoulders proximate the shaft; the lens holder base including registration elements that register the lens holder relative to the image sensor upon engaging the lens holder with the image sensor, thereby aligning the lens holder with the image sensor;
   a lens mounted in a bore of the shaft of the lens holder; and
   a spring bracket including:
      a pair of opposing, resilient legs located in the through-holes in the circuit board;
      v-spring portions extending inwardly from the legs and engaged with the shoulders of the lens holder; and
      a top plate extending from the v-spring portions and adapted for transmitting an upward force from the v-spring portions to the lens.

17. The camera assembly of claim 16 wherein the v-spring portions are (i) a first front v-spring and a first rear v-spring that extend from lateral sides of a first one of the pair of legs and (ii) a second front v-spring and a second rear v-spring that extend from lateral sides of a second one a second one of the pair of legs.

18. The camera assembly of claim 16 wherein the v-spring portions bias against the shoulders to produce a downward force on the lens holder.

19. The camera assembly of claim 16 wherein each one of the shoulders includes a slot into which a portion of the v-spring portions extend.

20. The camera assembly of claim 16 wherein the legs provide an outwardly directed biasing force against the circuit board.

21. The camera assembly of claim 16 wherein the bore is tapered.

* * * * *